United States Patent

Meyer

[11] 4,221,204
[45] Sep. 9, 1980

[54] THERMAL TIMER VALVE

[75] Inventor: Otto Meyer, Neuss, Fed. Rep. of Germany

[73] Assignee: Pierburg GmbH & Co., KG, Neuss, Fed. Rep. of Germany

[21] Appl. No.: 8,399

[22] Filed: Feb. 1, 1979

[30] Foreign Application Priority Data

Mar. 31, 1978 [DE] Fed. Rep. of Germany ....... 7809593

[51] Int. Cl.³ ............................................. F02B 33/00
[52] U.S. Cl. ................................ 123/568; 137/514.7; 188/317; 251/54; 261/DIG. 18
[58] Field of Search ............... 123/119 A; 251/47, 54; 137/514.7, 468; 188/279, 288, 311, 314, 316, 317, 318, 319

[56] References Cited

U.S. PATENT DOCUMENTS

| 2,723,846 | 11/1955 | Holder | 188/317 X |
| 3,732,889 | 5/1973 | Conery | 251/54 X |
| 3,990,418 | 11/1976 | Nohira | 123/119 A |
| 4,041,915 | 8/1977 | Honishi | 123/119 A |
| 4,044,739 | 8/1977 | Miura | 123/119 A |
| 4,114,125 | 9/1978 | Komatsu | 251/54 X |
| 4,137,880 | 2/1979 | Sarto | 123/119 A |

Primary Examiner—Harold W. Weakley
Attorney, Agent, or Firm—Haseltine, Lake & Waters

[57] ABSTRACT

A thermal timer valve for temperature-dependent operation of accessory devices of a fuel mixture preparation system of a combustion engine. The valve has a membrane chamber acted upon by intake pipe or manifold negative pressure. The membrane is connected to a rod which on one end has a valve closure element and on the other end a piston located in an oil chamber. The oil chamber may have an adjustable overflow channel. A disk check valve may be associated with the piston. Also there may be an overflow channel with a compensation chamber.

1 Claim, 3 Drawing Figures

THERMAL TIMER VALVE

BACKGROUND OF THE INVENTION

The present invention relates to a thermal timer valve for the temperature-dependent operation of accessory devices of a mixture preparation system of a combustion engine.

Such a valve should operate as a function of time after the start of the engine, for example, to actuate the exhaust gas feedback system. There are known valves which, after a set heat-up time of an electric heating element, open or close the valve flow passage by the shift of a bimetal disk. There are also known valves which are placed, for example, in the cooling water cycle of the engine and shift after reaching a certain temperature. Sometimes, electrical auxiliary equipment must be avoided to relieve the vehicle electrical system. The valves located in the cooling water cycle might have an intolerably long response time at extreme outside temperatures. This object is achieved by a valve of the above type by providing a membrane space subject to intake pipe negative pressure, with the membrane being connected to a rod which is connected on one end to a valve closure and on the other end to a piston in an oil chamber.

The novel features which are considered as characteristic for the invention is set forth in particularly in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
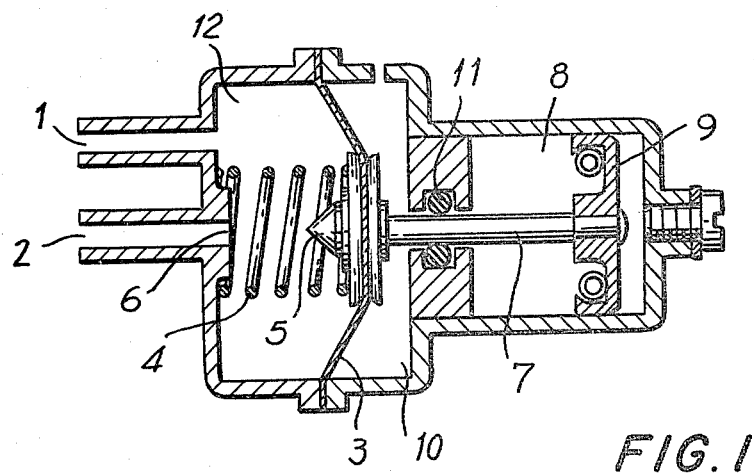
FIGS. 1–3 are sectional views showing the essential elements and their inter-relationship of different embodiments, in accordance with the present invention.

The connector 1 is connected to the intake pipe (not shown) and, via connector 2, acts upon an exhaust gas feedback system (not shown) which is designed so that there is no exhaust gas feedback as long as negative pressure or vacuum is applied via connector 2. Membrane 3 is moved by the negative pressure against the force of the spring 4 located in the control pressure chamber 12 until the valve closure element 5 contacts the valve seat 6 and interrupts the negative pressure supply to any accessory device. Membrane 3 is connected to a rod 7 which has the valve closure element 5 on one end and a piston 9 located in an oil chamber 8. The piston is an elastic molded piece. Between the reference pressure chamber 10, which is connected to the atmosphere, of the membrane housing and the oil chamber 8, a packing seal 11 for the rod is located. Between the wall of the oil chamber 8 and the molded part acting as piston, oil can always flow against the direction of motion of the piston. How quickly this movement, i.e. the shifting of membrane 3 takes place, depends on the viscosity of the oil. This viscosity changes with temperature. The valve is exposed to the radiation heat of the combustion engine. Hence the response time depends on the temperature. The shift produced under the pressure of spring 4 takes place through the lip of the molded part, more rapidly than the shift under the influence of the control pressure; this lip has the form of a check valve.

Figure 2:
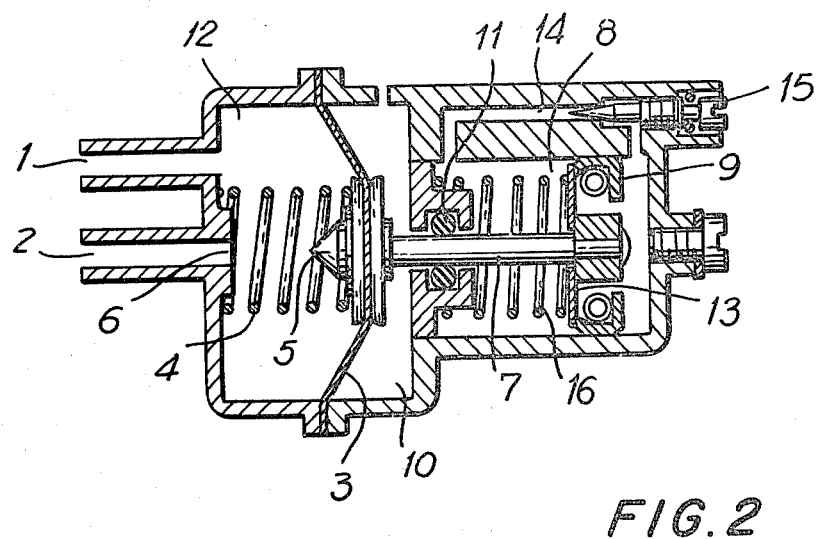

FIG. 2 shows a valve similar to that of FIG. 1. The same reference numerals are used for identical parts and are mentioned below only as necessary. This valve differs from the one described above in that spring plate check (nonreturn) valve 13 are located in the piston 9. Further, the two volumes of oil chamber 8, separated by piston 9, are connected by an overflow channel 14 whose cross section is adjustable by an adjustment screw 15. Hence the timing of the valve can be adjusted by an external manipulation. The oil chamber has an additional restoring spring 16.

Figure 3:
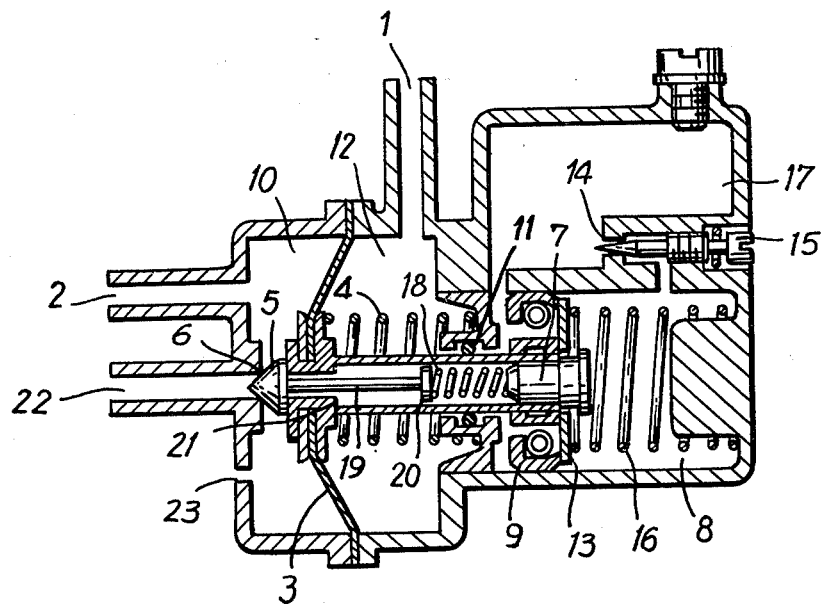

The embodiment of FIG. 3 shows a compensating chamber 17 connected to the overflow channel 14. In contrast to the previously described embodiments, the valve is designed as an opening valve and, after opening continuously supplies an accessory device with intake pipe pressure and thus keeps this pipe in the desired operation. If the control pressure chamber 12 is acted upon by intake pipe negative pressure, the membrane 3 shifts against the force of compression springs 4, 16. With disk valves 13 closed, piston 9 forces the oil through the overflow channel 14 and the oil thus reaches the other side of the piston.

Piston 9 in the area of the membrane has the shape of a pipe in which a compression spring 18 and a pin 19 carrying the closure element 5. While the membrane 3 shifts under the influence of the control pressure, the closure element 5 remains in the valve seat 6 until the pin 19 is picked up by the joint action of stops 20, 21. This is virtually at the end of the membrane shift.

Valve seat 6 is opened and the intake pipe negative pressure applied to connector 22 reaches the accessory device to be actuated via the line connection 2.

In the reference pressure chamber 10, a pressure between the applied negative (vacuum) pressure and the atmospheric pressure forms. The chamber 10 is continuously vented via the nozzle 23. Hence the pressure in chamber 10 is higher than the pressure in chamber 12 and the membrane 3 remains in the pulled-back position till the negative pressure applied via connector 1 breaks down and the pressure in control pressure chamber 12 rises. Hence the forces of springs 4, 16 can become effective and force the closure element 5 back to its seat 6. During the next engine start and the resultant negative pressure buildup, the shifting process is repeated; the time for this process changes as a function of the temperature change and the resultant change in viscosity, i.e., it is reduced upon heating or increased upon cooling.

It is also possible to conceive of a valve design where the shifting process is caused by a magnet and this shifting process is retarded by the oil overflow. For this purpose, the rod carrying the piston, on the end opposite the closure element, can be extended in such a way that it passes through the oil chamber and is there acted upon by the switching pin of the magnet. With this design, a membrane can be dispensed with and the negative pressure is merely used for actuating the accessory device.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A thermal timer valve for temperature-dependent operation of accessory devices of a mixture preparation system of a combustion engine, comprising: a membrane chamber; a membrane located in said membrane chamber; a rod connected to said membrane; a valve closure element connected to one end of said rod; an oil chamber; a piston connected to the other end of said rod and located in said oil chamber; said oil chamber having an adjustable overflow channel means, said piston having disk check valve means; said overflow channel means having a compensation chamber, said membrane chamber being subjected to intake pipe negative pressure; said valve being an opening valve and after opening supplies continuously an accessory device with intake pipe pressure for keeping said pipe operable, said membrane shifting against the force of compression springs when said membrane chamber is acted upon by intake pipe negative pressure; said piston forcing oil through said overflow channel when said disk valve means is closed so that oil reaches the other side of said piston, said piston having a shape of a pipe holding a compression spring and a pin carrying a closure element in the area of said membrane, said closure element remaining in a valve seat until said pin is actuate by joint action of two stops when said membrane shifts under influence of pressure, said valve seat being opened and intake pipe negative pressure reaching said accessory device to be actuated; a reference pressure chamber forming pressure between applied negative pressure and atmospheric pressure and having a nozzle for being continuously vented, said reference chamber having a pressure higher than the pressure in said membrane chamber, said membrane when being in retracted position until negative pressure is eliminated and the pressure in the membrane chamber rises so that forces of said compression springs can force said closure element back to the valve seat.

* * * * *